United States Patent
Mahalingam et al.

(10) Patent No.: US 7,743,389 B2
(45) Date of Patent: Jun. 22, 2010

(54) SELECTING BETWEEN PASS-THROUGH AND EMULATION IN A VIRTUAL MACHINE ENVIRONMENT

(75) Inventors: Mallik Mahalingam, Sunnyvale, CA (US); Boon Seong Ang, Sunnyvale, CA (US); Pankaj Thakkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/264,798

(22) Filed: Nov. 4, 2008

(65) Prior Publication Data

US 2009/0119684 A1    May 7, 2009

Related U.S. Application Data

(60) Provisional application No. 61/002,229, filed on Nov. 6, 2007.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/321; 719/327; 718/104

(58) Field of Classification Search .............. 719/321, 719/327; 710/22; 718/1, 104; 370/230
See application file for complete search history.

(56) References Cited

U.S. PATENT DOCUMENTS

| 7,467,381 | B2* | 12/2008 | Madukkarumukumana et al. | 718/1 |
|---|---|---|---|---|
| 7,558,723 | B2* | 7/2009 | Traut | 703/24 |
| 7,613,847 | B2* | 11/2009 | Kjos et al. | 710/22 |
| 2005/0198632 | A1* | 9/2005 | Lantz et al. | 718/1 |
| 2007/0002738 | A1* | 1/2007 | McGee | 370/230 |
| 2007/0044108 | A1* | 2/2007 | Panesar et al. | 719/321 |
| 2008/0140866 | A1* | 6/2008 | Corry et al. | 710/8 |

OTHER PUBLICATIONS

Abels et al, An Overview of Xen Virtualization, Dell Power Solutions, Aug. 2005, pp. 109-111.*
Strazdins et al, Performance Enhancement of SMP Clusters with Multiple Network Interfaces Using Virtualization, Springer-Verlag Berlin Heidelberg, 2006, pp. 452-463.*
Pratt et al, Xen 3.0 and the Art of Virtualization, Linux Symposium, 2005, pp. 65-77.*
David et al, Linux Ethernet Bonding Driver Howto, Apr. 2006, pp. 1-38.*

* cited by examiner

*Primary Examiner*—Diem K Cao

(57) ABSTRACT

According to one or more embodiments a logical virtual device may provide the desired functionality using either a virtual device or a physical device connected to a virtual machine. When the physical device is available, a guest operating system executing on a virtual machine (VM) can be instructed to utilize the physical device. When the VM is migrated between hosts of different underlying hardware, or when the physical device becomes unavailable, e.g., through dynamic reconfiguration or reallocation of physical resources, the guest operating system can be instructed to utilize the virtual device instead.

20 Claims, 7 Drawing Sheets

Guest OS Drivers included in VM 300B

Guest OS Drivers included in VM 300B

Flowchart 500

SELECTING BETWEEN PASS-THROUGH AND EMULATION IN A VIRTUAL MACHINE ENVIRONMENT

This application claims the benefit of U.S. Provisional Application No. 61/002,229 filed Nov. 6, 2007, which provisional application is incorporated herein by reference in its entirety.

FIELD

One or more embodiments in accordance with the present invention relate to virtualized computer systems, generally known as virtual machines.

BACKGROUND

Virtualization environments can provide multiple virtual machines (VMs) on a physical machine, with each VM looking like a full computer to "guest" software running inside the VM. This enables a user to concurrently run multiple copies of a guest operating system on one physical machine, with each guest having its own copy of "virtual hardware."

Many of today's virtualization environments support VM input/output (I/O) operations by providing virtual I/O devices that are emulated in software. This I/O virtualization approach has many advantages, including insulating the guest operating system from the specifics of the physical hardware on which it is running. This insulation in turn simplifies the task of moving a VM from one physical server to another, a process referred to herein as "VM migration." Such moves can occur "cold," when the VM is not booted up; "warm," when the VM is suspended; or "hot," when the VM is running and continues to run while it is moved from one physical server to another. With emulated virtual I/O devices, the emulation can run on any physical server, independent of the specifics of the physical I/O device. As such, a migrating VM continues to see the same set of virtual I/O devices across the migration. In essence, virtual I/O devices provide uniformity, with the emulation layer masking any diversity at the level of the physical I/O devices.

Another approach to providing VMs with I/O is to expose a subset of a physical machine's I/O infrastructure to each VM. The exposed physical I/O devices are then directly accessed by a guest device driver, e.g., software running inside the VM. This approach is referred to herein as "guest device pass-through" or simply "pass-through." There are a number of benefits to guest device pass-through, one of which is better performance. Emulation of virtual I/O devices consumes processor cycles, while the pass-through approach avoids much of the emulation overhead. As such, I/O operations from within a guest are likely to be faster with pass-through I/O devices then with emulated virtual I/O devices.

The pass-through I/O virtualization approach, however, makes it difficult to migrate VMs from one physical machine to another in a transparent manner because the specificity of physical I/O devices on the physical server is now exposed to guest software.

Additional information with regard to pass-through can be found in U.S. Provisional Patent Application Ser. No. 60/939,819 by M. Mahalingam et al., filed on May 23, 2007, entitled "Handling Interrupts When Virtual Machines of a Virtualized Computer System Have Direct Access to a Hardware Device," for which a utility patent application was filed on May 21, 2008 having Ser. No. 12/124,893; and U.S. Provisional Patent Application Ser. No. 60/939,818 by M. Mahalingam et al., filed on May 23, 2007, entitled "Providing Virtual Machines of a Virtualized Computer System with Direct Access to a Hardware Device," for which a utility patent application was filed on May 21, 2008 having Ser. No. 12/124,586; all of which are assigned to the assignee of the present application, and all of which applications are hereby incorporated by reference in their entirety.

SUMMARY

According to one or more embodiments of the present invention, a logical virtual device may provide desired functionality using either a virtual device or a physical device connected to a virtual machine (VM). When the physical device is available, a guest operating system executing on a VM can be instructed to utilize the physical device. When the VM is migrated between hosts of different underlying hardware, or when the physical device becomes unavailable, e.g., through dynamic reconfiguration or reallocation of physical resources, the guest operating system can be instructed to utilize the virtual device instead.

In accordance with one or more embodiments of the present invention, virtualization software configures a teaming driver for the guest operating system. A device driver for the physical device and a device driver for the virtual device are "teamed" or grouped, and the teaming driver controls which device driver the guest operating system utilizes when I/O operations are performed. By configuring the teaming driver, the virtualization software determines whether the virtual machine uses the physical device or the virtual device.

DETAILED DESCRIPTION

Figure 1:
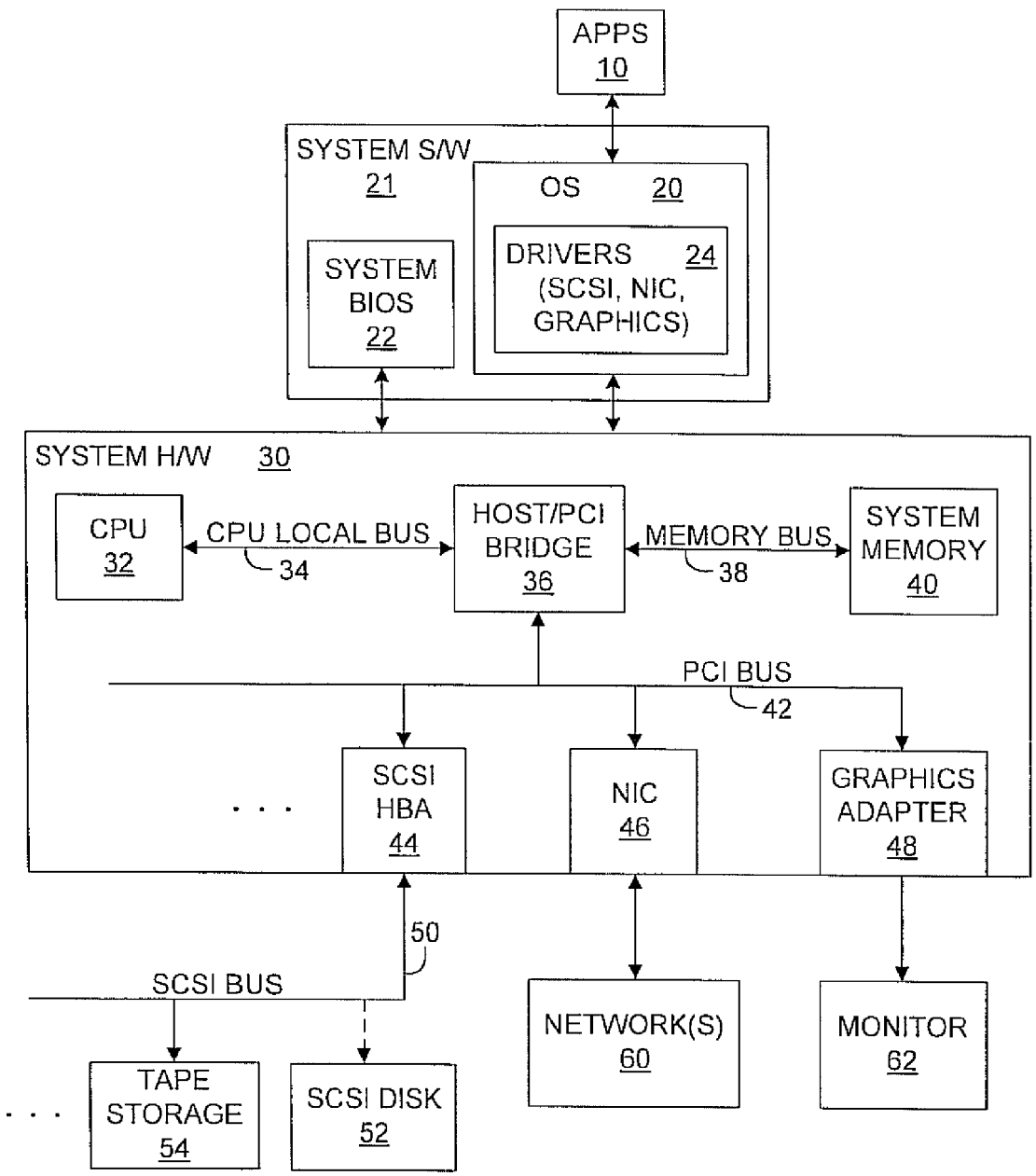
FIG. 1 is a block diagram of a general, non-virtualized computer system upon which embodiments in accordance with the invention may be implemented.

One or more embodiments of the present invention relate to providing limited, direct access to a physical device from within a computing environment that is at least partially virtualized. One or more embodiments of the present invention may be implemented in a wide variety of physical computer systems, having a wide variety of hardware platforms and configurations, and a wide variety of software platforms and configurations. One or more embodiments of the present invention may also be implemented in computer systems having varying degrees and/or types of virtualization, including fully virtualized computer systems, so-called para-virtualized computer systems, and a wide variety of other types of virtual computer systems, including virtual computer systems in which a virtualized hardware platform is either substantially the same as or substantially different from the underlying physical hardware platform. One or more embodiments of the present invention may also be implemented to provide limited, direct access to a wide variety of physical devices that may interface with a physical computer system in a variety of ways. It is understood that embodiments may be implemented on computer systems such as desktop or server computers, and also on application-specific and embedded computer systems, including but not limited to mobile phones and smart phones, videogame and other electronic entertainment devices, and portable computing devices like personal digital assistants (PDAs).

One particular embodiment of the invention is described below merely to provide an example of how the invention can be implemented. A person of skill in the art will understand, based on the teachings of this exemplary embodiment, how to implement further embodiments of the invention in a wide variety of other ways, to provide access to a wide variety of physical devices, in a wide variety of computer systems. Thus, the exemplary embodiment is described in terms of a specific physical computer system, having a specific hardware platform and configuration, and a specific software platform and configuration, although one or more embodiments of the invention may also be implemented in a wide variety of other physical computer systems. The exemplary embodiment is also described in terms of a specific virtual computer system implemented within the physical computer system, although the further embodiments of the invention may also be implemented in connection with a wide variety of other virtual computer systems. The exemplary embodiment is also described in terms of a specific physical device, although further embodiments of the invention may be implemented in connection with a wide variety of other physical devices. In particular, the exemplary embodiment involves a NIC (network interface card) interfacing to a PCI (Peripheral Component Interconnect) bus for providing a VM (virtual machine) with direct access to a computer network, although further embodiments of the invention may also be implemented in connection with a wide variety of other physical devices. For example, further embodiments of the invention may be implemented in connection with a different physical device that also interfaces to a PCI bus and implements a different function, such as a SCSI (Small Computer System Interface) HBA (host bus adapter) card or fiber channel HBA, for example. Alternatively, further embodiments of the invention may be implemented in connection with a physical device that interfaces with a different type of I/O subsystem, or that interfaces with the physical computer system in some other way, and that implements any of a variety of functions.

FIG. 1 shows a general computer system that forms the basis for the exemplary embodiment described below. As shown in FIG. 1, the general computer system comprises system hardware 30 which may be a conventional computer system, such as an ordinary personal computer based on the widespread "x86" processor architecture. System hardware 30 may include conventional components, such as one or more processors, system memory, and a local disk. The system memory is typically some form of high-speed RAM (random access memory), whereas the disk (one or more) is typically a non-volatile, mass storage device. System hardware 30 may also include other conventional mechanisms such as a memory management unit (MMU), various registers and various input/output (I/O) devices.

Specifically, as shown in FIG. 1, system hardware 30 includes processor or central processing unit 32 (CPU 32), host/PCI bridge 36, system memory 40, SCSI HBA 44, NIC 46 (network interface card), and graphics adapter 48, each of which may be conventional devices. As shown in FIG. 1, processor 32 is connected to host/PCI bridge 36 by CPU local bus 34 in a conventional manner; system memory 40 is connected to host/PCI bridge 36 by memory bus 38 in a conventional manner; and SCSI HBA 44, NIC 46 and graphics adapter 48 are connected to host/PCI bridge 36 by PCI bus 42 in a conventional manner. As further shown in FIG. 1, graphics adapter 48 is connected to conventional video monitor 62 in a conventional manner; NIC 46 is connected to one or more conventional data networks 60 in a conventional manner (networks 60 may be based on Ethernet technology, for example, and the networks may use the Internet Protocol and the Transmission Control Protocol (TCP/IP), for example); and SCSI HBA 44 supports SCSI bus 50 in a conventional manner where various devices may be connected to SCSI bus 50 in a conventional manner. For example, FIG. 1 shows SCSI disk 52 and tape storage device 54 connected to the SCSI bus 50. Other devices may also be connected to SCSI bus 50.

Computer systems generally also have system level software and application software executing on the system hardware. Thus, FIG. 1 shows system software 21 executing on system hardware 30. System software 21 is shown as including operating system 20 (OS 20) and system BIOS 22 (Basic Input/Output System 22), although other system level software configurations are also possible. OS 20 may be a conventional OS for system hardware 30. OS 20 may include a set of drivers 24, some of which may be packaged with the OS 20, and some of which may be separately loaded onto system hardware 30. Drivers 24 may provide a variety of functions, including supporting interfaces with SCSI HBA 44, NIC 46 and graphics adapter 48. Drivers 24 may also be conventional for system hardware 30 and OS 20. System BIOS 22 may also be conventional for system hardware 30. Finally, FIG. 1 also shows a set of one or more applications 10 executing on system hardware 30. Applications 10 may also be conventional for system hardware 30 and OS 20.

The computer system of FIG. 1 may be initialized in a conventional manner. Thus, when the computer system is powered up or restarted, system BIOS 22 and/or OS 20, or, more generally, system software 21, may detect and configure various aspects of system hardware 30 in a conventional manner. Of particular relevance to one or more embodiments of the present invention, system software 21 may detect and configure devices on PCI bus 42 in a conventional manner, including, in particular, SCSI HBA 44. A person of skill in the art will understand how devices are detected and configured on PCI bus 42. Very briefly, a PCI device typically implements at least 16 "doublewords" of standard configuration registers where there are 32 bits in a "doubleword." System software 21 attempts to access the configuration registers of PCI devices at each possible location on PCI bus 42, including each PCI slot in system hardware 30. Attempting to access the configuration registers enables system software 21 to determine whether there is a PCI device at each possible location on PCI bus 42, as well as the function or functions that are implemented in each PCI device. System software 21 can then obtain additional information from the configuration registers of each PCI device and configure the devices appropriately.

If a PCI device implements an extended ROM (read only memory), which may also be referred to as a device ROM or option ROM, then system software 21 typically also copies a code image from the ROM on the PCI device into RAM memory 40 within system hardware 30. An initialization module within the code image is typically also executed as part of the initialization process, which initialization process may further initialize the PCI device and/or other devices connected to the PCI device. Referring again to FIG. 1, during the initialization process, system software 21 attempts to access the configuration registers of PCI devices at each possible location on PCI bus 42 and detects graphics adapter 48, NIC 46 and SCSI HBA 44. System software 21 determines the functions implemented in each of these devices, along with other relevant information, and initializes each of the devices appropriately. SCSI HBA 44 typically includes an extended ROM, which contains an initialization module that, when executed, initializes SCSI bus 50 and devices connected to SCSI bus 50, including SCSI disk 52 and tape storage device 54. Initialization of PCI bus 42; the devices connected to the PCI bus, including graphics adapter 48, NIC 46, and SCSI HBA 44; SCSI bus 50; and devices connected to the SCSI bus, including SCSI disk 52 and tape storage device 54, may all be performed in a conventional manner.

After the computer system of FIG. 1 is initialized, including the devices on PCI bus 42, the configuration registers in the respective PCI devices may be accessed on an ongoing basis to interact with the PCI devices and to utilize the functions implemented by the PCI devices. In particular, configuration registers in SCSI HBA 44 may be accessed to determine which SCSI HBA is connected to PCI bus 42, to determine characteristics of the devices connected to PCI bus 42 and to interface with the devices on SCSI bus 50, all in a conventional manner.

Also, after the computer system of FIG. 1 is initialized, software executing on system hardware 30 may perform I/O transfers to and from devices on PCI bus 42, namely I/O writes to devices on PCI bus 42 and I/O reads from devices on PCI bus 42. These I/O transfers are performed in a conventional manner using the memory regions and/or I/O regions specified in the Base Address registers of a PCI device. These I/O transfers may be DMA (direct memory access) transfers from the devices or they may be non-DMA transfers. In the case of SCSI HBA 44, software executing on system hardware 30 may perform I/O transfers to and from devices on SCSI bus 50, through SCSI HBA 44, in a convention manner. For example, such I/O transfers through SCSI HBA 44 may be used to write data to SCSI disk 52 or to read data from SCSI disk 52, both in a conventional manner. For an I/O write to SCSI disk 52, CPU 32 conveys data to SCSI HBA 44, which then conveys the data across SCSI bus 50 to SCSI disk 52; while, for an I/O read from SCSI disk 52, SCSI disk 52 transmits data across SCSI bus 50 to SCSI HBA 44, and SCSI HBA 44 conveys the data to CPU 32. Such I/O transfers may be performed, for example, by SCSI driver 24 on behalf of application software in one of applications 10.

These I/O transfers to and from PCI devices may be further broken down into (a) transactions initiated by CPU 32 and (b) transactions initiated by the PCI devices. Non-DMA I/O transfers involve only CPU-initiated transactions. For a non-DMA write, CPU 32 initiates the transfer, writes data to the PCI device, and the PCI device receives the data, all in the same transaction. For a non-DMA read, CPU 32 initiates the transfer and the PCI device retrieves the data and provides it to CPU 32, again all in the same transaction. Thus, non-DMA I/O transfers may be considered simple CPU accesses to the PCI devices.

DMA I/O transfers, in contrast, involve transactions initiated by the PCI devices. For a DMA write transfer, CPU 32 first writes data to a memory region without any involvement by a PCI device. CPU 32 then initiates the DMA transfer in a first transaction, involving a CPU access to the PCI device. Subsequently, the PCI device reads the data from the memory region in a second transaction. This second transaction may be considered a "DMA operation" by the PCI device.

For a DMA read operation, CPU 32 initiates the DMA transfer in a first transaction, involving a CPU access to the PCI device. The PCI device then retrieves the data and writes it into a memory region in a second transaction, which may also be considered a "DMA operation" by the PCI device. Next, the CPU reads the data from the memory region without any further involvement by the PCI device. Thus, DMA I/O transfers to and from a PCI device generally involves both a CPU access to the PCI device and a DMA operation by the PCI device.

In addition to accesses to the configuration registers of PCI devices and I/O transfers to and from PCI devices, PCI devices also typically generate interrupts to CPU 32 for various reasons, such as upon completion of a DMA transfer. Such interrupts may be generated and handled in a conventional manner.

In summary, there are four general types of transactions that occur between CPU 32 and a PCI device, such as SCSI HBA 44. A first transaction type ("a configuration transaction") involves an access by CPU 32 to the configuration registers of the PCI device, such as the PCI configuration registers of SCSI HBA 44. A second transaction type ("an I/O transaction") involves an access by CPU 32 to the PCI device, through the memory and/or I/O region(s) specified by the Base Address registers of the PCI device. A third transaction type ("a DMA operation") involves a DMA operation by the PCI device, which involves a read from or a write to a memory region specified by a Base Address register of the PCI device. A fourth transaction type ("an interrupt") involves an interrupt from the PCI device to CPU 32, such as upon completion of a DMA transfer.

The advantages of virtual machine technology have become widely recognized. Among these advantages is an ability to run multiple virtual machines on a single host platform. This makes better use of the capacity of the hardware, while still ensuring that each user enjoys the features of a "complete" computer. Depending on how it is implemented, virtualization can also provide greater security, since virtualization can isolate potentially unstable or unsafe software so that it cannot adversely affect the hardware state or system files required for running the physical (as opposed to virtual) hardware.

Figure 2A:
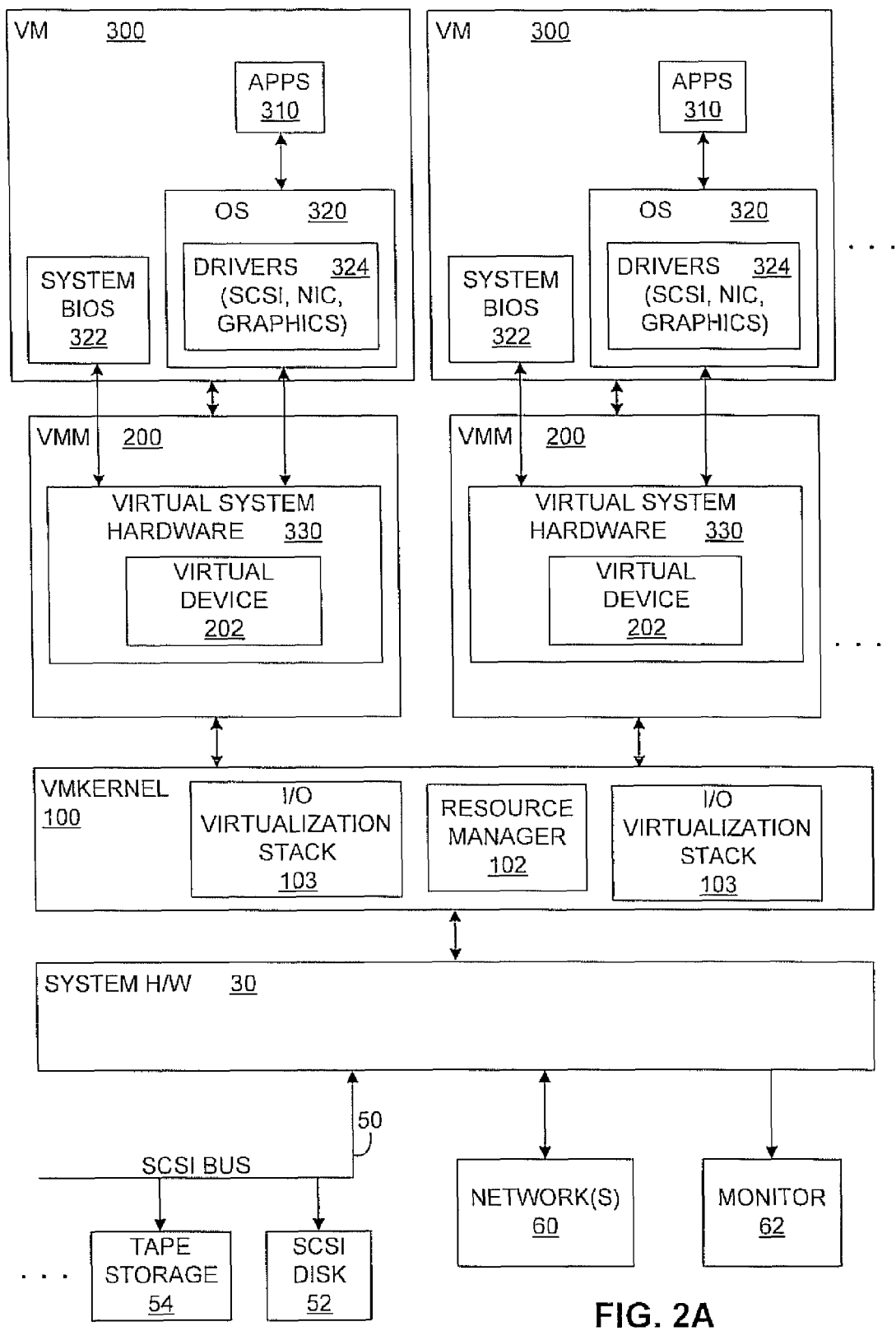
FIG. 2A is a block diagram of a general, kernel-based, virtual computer system.

As is well known in the field of computer science, a virtual machine (VM) is an abstraction—a "virtualization"—of an actual physical computer system. FIG. 2A shows one possible arrangement of a computer system that implements virtualization. As shown in FIG. 2A, one or more VMs 300, or "guests," are installed on a "host platform," or simply "host," which will include system hardware, and one or more layers or co-resident components comprising system-level software, such as an operating system or similar kernel, or a virtual machine monitor or hypervisor (see below), or some combination of these. The system hardware typically includes one or more processors, memory, some form of mass storage, and various other devices.

The computer system of FIG. 2A is shown as having the same system hardware 30 as is shown in FIG. 1, and as is described above. Thus, system hardware 30 of FIG. 2A also includes processor 32, host/PCI bridge 36, system memory 40, SCSI HBA 44, NIC 46, and graphics adapter 48 shown in FIG. 1, although these devices are not illustrated in FIG. 2A for simplicity. As also illustrated in FIG. 1, but not in FIG. 2A, processor 32 is connected to host/PCI bridge 36 by CPU local bus 34 in a conventional manner; system memory 40 is connected to host/PCI bridge 36 by memory bus 38 in a conventional manner; and SCSI HBA 44, NIC 46 and graphics adapter 48 are connected to host/PCI bridge 36 by PCI bus 42 in a conventional manner.

FIG. 2A also shows the same video monitor 62, the same networks 60 and the same SCSI bus 50 as are shown in FIG. 1, along with the same SCSI disk 52 and the same tape storage device 54, which are again shown as being connected to SCSI bus 50. Other devices may also be connected to SCSI bus 50. Thus, graphics adapter 48 (not shown in FIG. 2A) is connected to video monitor 62 in a conventional manner; NIC 46 (not shown in FIG. 2A) is connected to data networks 60 in a conventional manner; and SCSI HBA 44 (not shown in FIG. 2A) supports SCSI bus 50 in a conventional manner.

Guest system software runs on VMs 300. Each VMM 200 (or an area where VM 300 and VMM 200 overlap) typically includes virtual system hardware 330. Virtual system hardware 330 typically includes at least one virtual CPU, some virtual memory, and one or more virtual devices. All of virtual hardware components of a VM may be implemented in software using known techniques to emulate corresponding physical components.

Figure 2B:
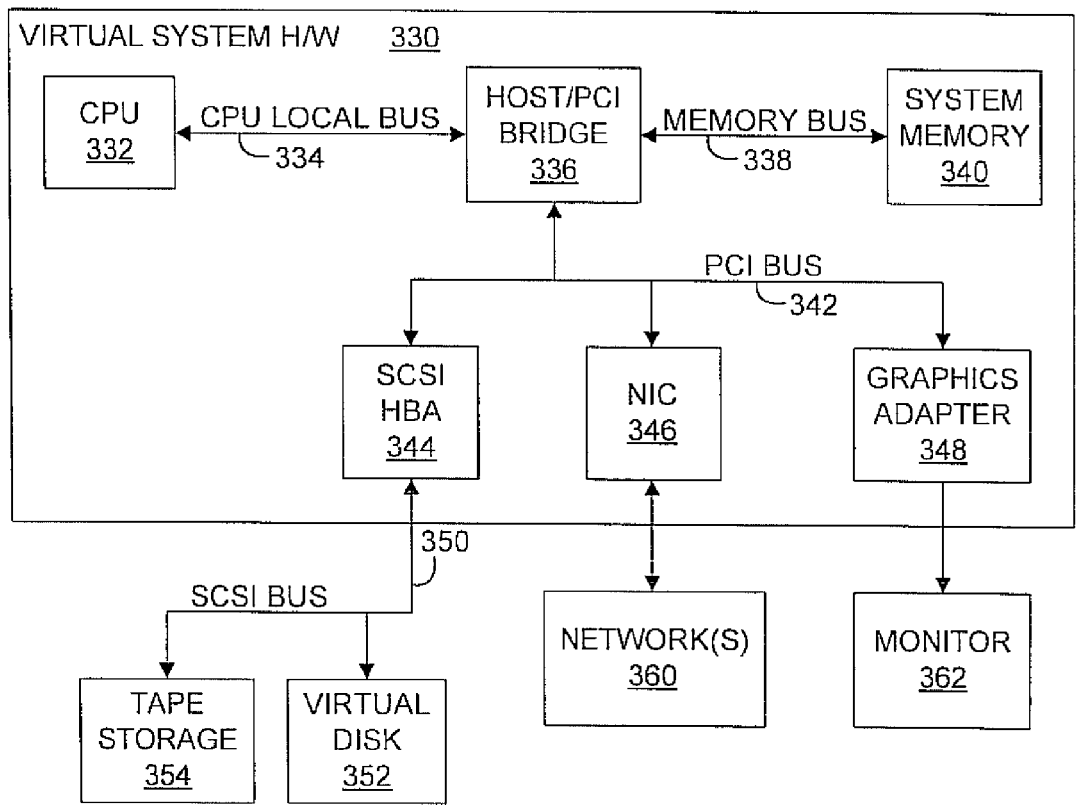
FIG. 2B is a block diagram of virtual system hardware for the virtual machines (VMs) of FIG. 2A.

For the example the virtual computer system of FIGS. 2A and 2B (including virtual system hardware 330) is functionally similar to underlying physical system hardware 30, although, for other virtual computer systems, the virtual system hardware may be quite different from the underlying physical system hardware. Thus, FIG. 2B shows processor 332 (CPU 332), host/PCI bridge 336, system memory 340, SCSI HBA 344, NIC 346, and graphics adapter 348, each of which may be implemented as conventional devices, substantially similar to corresponding devices in underlying physical hardware 30. Processor 332 appears to be connected to host/PCI bridge 336 in a conventional manner, as if by CPU local bus 334; system memory 340 appears to be connected to host/PCI bridge 336 in a conventional manner, as if by memory bus 338; and SCSI HBA 344, NIC 346 and graphics adapter 348 appear to be connected to host/PCI bridge 336 in a conventional manner, as if by PCI bus 342.

Graphics adapter 348 appears to be connected to conventional video monitor 362 in a conventional manner; NIC 346 appears to be connected to one or more conventional data networks 360 in a conventional manner; SCSI HBA 344 appears to support SCSI bus 350 in a conventional manner; and virtual disk 352 and tape storage device 354 appear to be connected to SCSI bus 350, in a conventional manner. Virtual disk 352 typically represents a portion of SCSI disk 52. It is common for virtualization software to provide guest software within a VM with access to some portion of a SCSI disk, including possibly a complete LUN (logical unit number), multiple complete LUNs, some portion of a LUN, or even some combination of complete and/or partial LUNs. Whatever portion of the SCSI disk is made available for use by the guest software within the VM is often presented to the guest software in the form of one or more complete virtual disks. Methods for virtualizing a portion of a SCSI disk as one or more virtual disks are known in the art. Other than presenting a portion of SCSI disk 52 as a complete virtual disk 352, all of the virtual devices illustrated in FIG. 2B may be emulated in such a manner that they are functionally similar to the corresponding physical devices illustrated in FIG. 1, or the virtual devices may be emulated so as to make them quite different from the underlying physical devices.

Guest system software in VMs 300 of FIG. 2A includes OS 320, including a set of drivers 324, and system BIOS 322. FIG. 2A also shows one or more applications 310 running within VMs 300. OS 320 may be substantially the same as OS 20 of FIG. 1, or it may be substantially different; drivers 324 may be substantially the same as drivers 24 of FIG. 1, or they may be substantially different; system BIOS 322 may be substantially the same as system BIOS 22 of FIG. 1, or it may be substantially different; and applications 310 may be substantially the same as applications 10 of FIG. 1, or they may be substantially different. Also, each of these software units may be substantially the same between different VMs, as suggested in FIG. 2A, or they may be substantially different.

Note that a single VM may be configured with more than one virtualized processor. To permit computer systems to scale to larger numbers of concurrent threads, systems with multiple CPUs have been developed. For example, symmetric multi-processor (SMP) systems are available as extensions of a personal computer (PC) platform and from other vendors. Essentially, an SMP system is a hardware platform that connects multiple processors to a shared main memory and shared I/O devices. Virtual machines may also be configured as SMP VMs.

Yet another configuration is found in a so-called "multi-core" architecture, in which more than one physical CPU is fabricated on a single chip, with its own set of functional units (such as a floating-point unit and an arithmetic/logic unit, ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. One or more embodiments of the present invention may be used regardless of the type—physical and/or logical—or number of processors included in a VM or in the physical system hardware.

In some cases, a VM may be designed so that applications 310 running on thereon will function as they would if run on a "real" computer, even though the applications are running at least partially indirectly, that is via guest OS 320 and virtual processor(s). Executable files will be accessed by the guest OS from a virtual disk or virtual memory which will be portions of an actual physical disk or memory allocated to that VM. Once an application is installed within the VM, guest OS 320 retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. One or more embodiments of the present invention described below may generally be used in virtualized computer systems having any type or configuration of virtualization software.

FIG. 2A shows VMMs 200 that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that one or more embodiments of the invention can be implemented anywhere within the overall structure of the virtualization software, and even in systems that provide specific hardware support for virtualization.

Various virtualized hardware components may be considered to be part of the VMM 200 for the sake of conceptual simplicity. In actuality, these "components" are usually implemented as software emulations by virtual device emulators 202 included in the VMMs. One advantage of such an arrangement is that the VMMs may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 2A). In a hosted virtualized computer system, an existing, general-purpose operating system forms a "host" OS that is used to perform certain input/output (I/O) operations, alongside and sometimes at the request of the VMM. The Workstation virtualization product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 2A, in many cases, it may be beneficial to deploy VMMs on top of a software layer—kernel 100 (also referred to as VMKernel 100)—constructed specifically to provide efficient support for the VMs. This configuration is frequently referred to as being "non-hosted." Compared with a system in which VMMs run directly on the hardware platform, use of a kernel may offer greater modularity and may facilitate provision of services that extend across multiple virtual machines. Thus, the VMM may include resource manager 102, for example, for managing resources across multiple virtual machines. Compared with a hosted deployment, a kernel may offer greater performance because it can be co-developed with the VMM and be optimized for the characteristics of a workload consisting primarily of VMs/VMMs. VMkernel 100 may also handle other applications running on it that can be separately scheduled, as well as a console operating system that, in some architectures, is used to boot the system and facilitate certain user interactions with the virtualization software.

Note that VMKernel 100 is not the same as the kernel that will be within guest OS 320—as is well known, every operating system has its own kernel. Note also that kernel 100 is part of the "host" platform of the VM/VMM as defined above even though the configuration shown in FIG. 2A is commonly termed "non-hosted;" moreover, the VMKernel is part of the host and part of the virtualization software or "hypervisor." The difference in terminology is one of perspective and definitions that are still evolving in the art of virtualization. One example of a non-hosted, virtualized computer system is described in U.S. Pat. No. 6,961,941 (Nelson et al., "Computer Configuration for Resource Management in Systems Including a Virtual Machine," 1 Nov. 2005).

As a generalization, some form of "virtualization software" executes between system hardware 30 and one or more VMs 300. The virtualization software uses the resources of system hardware 30 and emulates virtual system hardware 330. Thus, virtualization software typically comprises one or more device emulators 202, and either includes or executes in conjunction with some form of system software for accessing and controlling system hardware 30. The virtualization software may provide full virtualization or partial virtualization. In the non-hosted virtual computer system of FIG. 2A, the virtualization software may be considered to comprise VMMs 200, along with some portions of VMKernel 100, such as one or more software modules that may share physical system resources between multiple VMs. The virtualization software operates in conjunction with system software that is also contained in VMKernel 100. Similarly, in a hosted virtual computer system, the virtualization software may be considered to primarily comprise VMMs 200, which operate in conjunction with system software in the form of the host OS. Various other configurations for virtualization software and system software are also possible.

One or more embodiments of the present invention may be used to advantage in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). One or more embodiments of the present invention may also be implemented directly in a computer's primary OS, both where the OS is designed to support virtual machines and where it is not. Moreover, one or more embodiments of the present invention may even be implemented wholly or partially in hardware, for example in processor architectures intended to provide hardware support for virtual machines.

With references to FIGS. 2A and 2B, one of device emulators 202 emulates virtual SCSI HBA 344 using physical SCSI HBA 44 to actually perform data transfers, etc. Thus, for example, if guest software attempts to read data from what it sees as virtual disk 352, SCSI device driver 324 typically interacts with what it sees as SCSI HBA 344 to request the data. Device emulator 202 responds to device driver 324, and causes physical SCSI HBA 44 to read the requested data from an appropriate location within physical SCSI disk 52. Device emulator 202 typically has to translate a SCSI I/O operation initiated by device driver 324 into a corresponding SCSI operation to SCSI HBA 44 and finally onto SCSI disk 52. Methods for emulating disks and SCSI disks, and for translating disk operations during such emulations, are known in the art.

During the operation of VM 300, SCSI driver 324 typically interacts with virtual SCSI HBA 344 just as if it were a real, physical SCSI HBA. At different times, SCSI driver 324 may exercise different functionality of virtual SCSI HBA 344, and so device emulator 202 typically must emulate all the functionality of the virtual SCSI HBA. However, device emulator 202 does not necessarily have to emulate all of the functionality of physical SCSI HBA 44. Virtual SCSI HBA 344 emulated by device emulator 202 may be substantially different from physical SCSI HBA 44. For example, virtual SCSI HBA 344 may be more of a generic SCSI HBA, implementing less functionality than physical SCSI HBA 44. Nonetheless, device emulator 202 typically emulates all the functionality of some SCSI HBA. Thus, for example, SCSI driver 324 may attempt to access the PCI configuration registers of virtual SCSI HBA 344, and device emulator 202 typically must emulate the functionality of the configuration registers.

Figure 3A:
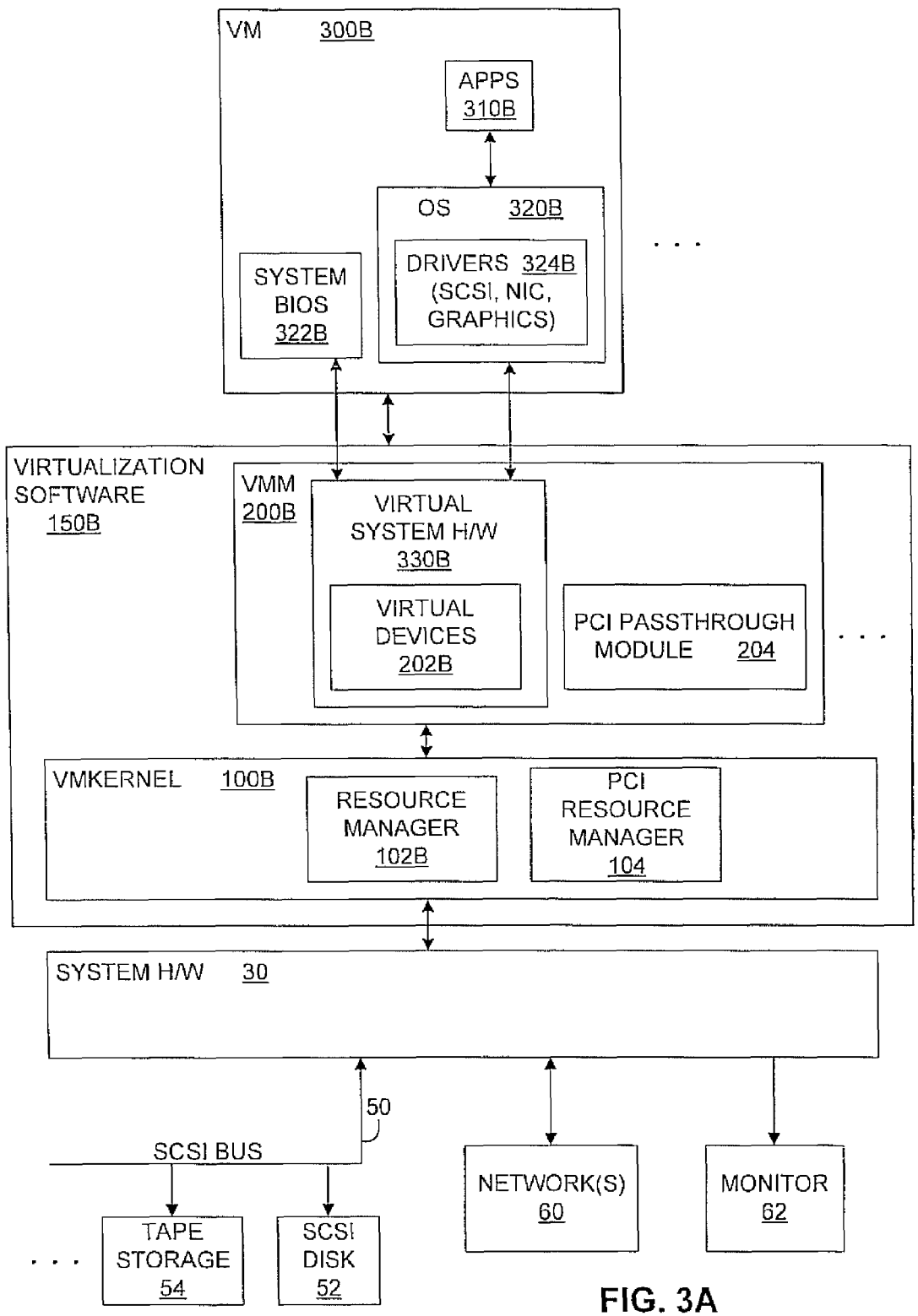
FIG. 3A is a block diagram illustrating an embodiment of the invention in a generalized, kernel-based, virtual computer system.

FIG. 3A is a block diagram illustrating an embodiment of the invention in a generalized, kernel-based, virtual computer system in which the physical system hardware includes a PCI bus and a SCSI HBA PCI device supporting a SCSI bus. The computer system of FIG. 3A is shown as having the same system hardware 30 as is shown in FIGS. 1 and 2A, and as is described above. Thus, system hardware 30 of FIG. 3A also includes processor 32, host/PCI bridge 36, system memory 40, SCSI HBA 44, NIC 46, and graphics adapter 48 of FIG. 1, although these devices are not illustrated in FIG. 3A for simplicity. As also illustrated in FIG. 1, but not in FIG. 3A, processor 32 is connected to host/PCI bridge 36 by CPU local bus 34 in a conventional manner; system memory 40 is connected to host/PCI bridge 36 by memory bus 38 in a conventional manner; and SCSI HBA 44, NIC 46 and graphics adapter 48 are connected to host/PCI bridge 36 by PCI bus 42 in a conventional manner. FIG. 3A also shows the same video monitor 62, the same networks 60 and the same SCSI bus 50 as are shown in FIGS. 1 and 2A, along with the same SCSI disk 52 and the same tape storage device 54, which are again shown as being connected to SCSI bus 50. Other devices may also be connected to SCSI bus 50. Thus, graphics adapter 48 (not shown in FIG. 3A) is connected to video monitor 62 in a conventional manner; NIC 46 (not shown in FIG. 3A) is connected to data networks 60 in a conventional manner; and SCSI HBA 44 (not shown in FIG. 3A) supports SCSI bus 50 in a conventional manner.

FIG. 3A also shows VMKernel 100B, which, except as described below, may be substantially the same as VMKernel 100 of FIG. 2A. Thus, VMKernel 100B includes resource manager 102B, which, except as described below, may be substantially the same as resource manager 102 of FIG. 2A. Note that VMKernel 100B also includes PCI resource manager 104. As will be explained below, PCI resource manager 104 manages the resources of PCI pass-through module 204, created according to one or more embodiments of the present invention, such as by creating and managing the configuration register for PCI pass-through devices.

FIG. 3A also shows VMM 200B, which, except as described below, may be substantially the same as VMM 200 of FIG. 2A. Thus, VMM 200B includes virtual system hardware 330B, which includes a set of virtual devices 202B, which, except as described below, may be substantially the same as virtual devices 202 of FIG. 2A. Note also that VMM 200B includes PCI pass-through module 204 created according to one or more embodiments of the present invention. In accordance with one or more embodiments of the present invention, PCI pass-through module 204 is a software module created in VMM 200B as a virtualization module for providing VM 300B with direct access to corresponding physical hardware devices. As will be explained below in more detail, PCI pass-through module 204 advertises hardware devices to appear in the virtual PCI bus hierarchy, provides transparent/non-transparent mapping to hardware devices, handles interrupts from pass-through devices, and serves as a conduit for accessing the pass-through devices. As shown in FIG. 3A, VMKernel 100B and VMM 200B may generally be referred to as virtualization software 150B. Such virtualization software may take a wide variety of other forms in other embodiments of the invention.

FIG. 3A also shows VM 300B, which, except as described below, may be substantially the same as VMs 300 of FIG. 2A. Thus, VM 300B includes a set of applications 310B, which may be substantially the same as the set of applications 310 of FIG. 2A; OS 320B, which may be substantially the same as OS 320 of FIG. 2A; a set of drivers 324B, which may be substantially the same as the set of drivers 320 of FIG. 2A; and system BIOS 322B, which may be substantially the same as system BIOS 322 of FIG. 2A. OS 320B, drivers 324B and system BIOS 322B constitute guest system software for VM 300B. The guest system software has direct access to a physical hardware device through PCI pass-through module 204 under resource management by PCI resource manager 104.

Figure 3B:
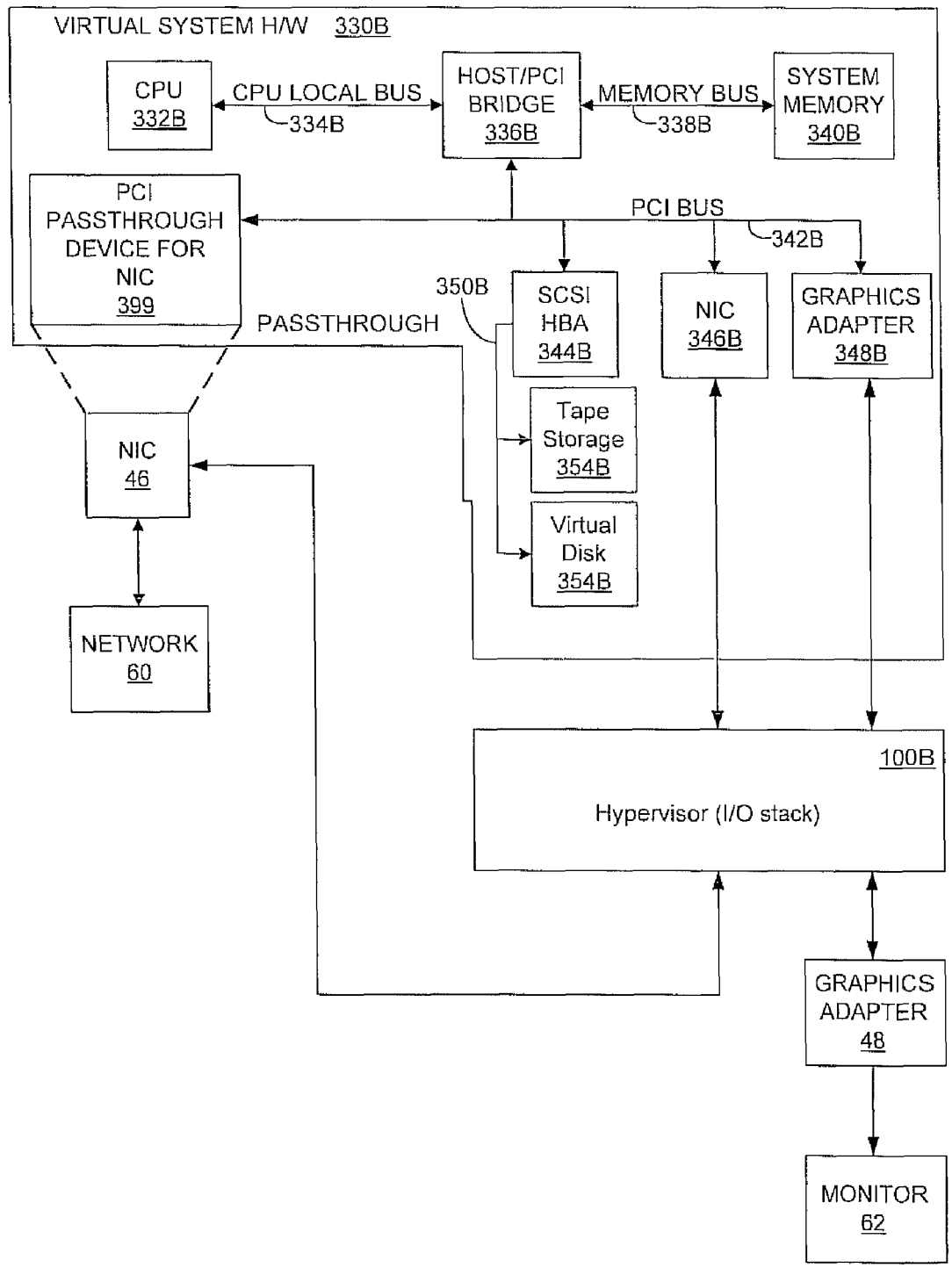
FIG. 3B is a block diagram of virtual system hardware for a VM of FIG. 3A according to one embodiment of the present invention.

As also shown in FIG. 3A, VM 300B includes virtual system hardware 330B, which, except as described below, may be substantially the same as virtual system hardware 330 of FIG. 2A. FIG. 3B shows aspects of virtual system hardware 330B that are most relevant to one or more embodiments of the invention. Again, for the example virtual computer system of FIGS. 3A and 3B, virtual system hardware 330B is functionally similar to underlying physical system hardware 30, although, for other virtual computer systems, the virtual system hardware may be quite different from the underlying physical system hardware. Thus, FIG. 3B shows processor (CPU) 332B, host/PCI bridge 336B, system memory 340B, NIC 346B, and graphics adapter 348B, each of which may be implemented as conventional devices substantially similar to corresponding devices in underlying physical hardware 30.

Processor 332B appears to be connected to host/PCI bridge 336B in a conventional manner, as if by CPU local bus 334B; system memory 340B appears to be connected to host/PCI bridge 336B in a conventional manner, as if by memory bus 338B; and SCSI HBA 344B, NIC 346B and graphics adapter 348B appear to be connected to host/PCI bridge 336B in a conventional manner, as if by PCI bus 342B. SCSI HBA 344B appears to be connected to SCSI bus 350B, tape storage 354B, and virtual disk 352B in a conventional manner.

As shown in FIG. 3B, virtual system hardware 330B includes PCI pass-through device 399 connected to PCI bus 342B. PCI pass-through device 399 in the example of FIG. 3B is a virtualization of NIC 46, but is virtually connected to virtual PCI bus 342 so that VM 300B can have direct access to NIC 46 through PCI pass-through device 399 as though NIC 46 were directly connected to VM 300B.

To expose a physical hardware device such as NIC 46 to VM 300B, PCI pass-through module 204 obtains actual PCI resource information (e.g., vendor identifier, class identifier, subclass, base address register values, real IRQ/vector assigned to the device, etc.) from PCI resource manager 104 for the corresponding physical hardware device (e.g., NIC 46). Once the PCI resource information is obtained, PCI pass-through module 204 sets up virtual PCI device (PCI pass-through device) 399 that contains the configuration information derived from the original physical hardware device (e.g., NIC 36). PCI pass-through device 399 is hooked up to virtual PCI bus 342B that is visible to guest software 320B. As part of setting up PCI pass-through device 399, a callback is registered to handle the PCI configuration cycle, so when guest BIOS 322B or guest OS 320B performs PCI configuration access, PCI pass-through module 204 gets notified. Additional information can be found in U.S. Provisional Patent Application Ser. No. 60/939,819 by M. Mahalingam et al., filed on May 23, 2007, entitled "Handling Interrupts When Virtual Machines of a Virtualized Computer System Have Direct Access to a Hardware Device," for which a utility patent application was filed on May 21, 2008 having Ser. No. 12/124,893; and U.S. Provisional Patent Application Ser. No. 60/939,818 by M. Mahalingam et al., filed on May 23, 2007, entitled "Providing Virtual Machines of a Virtualized Computer System with Direct Access to a Hardware Device," for which a utility patent application was filed on May 21, 2008 having Ser. No. 12/124,586.

According to one or more embodiments of the present invention, instead of providing a virtual device that is only emulated in software, a logical virtual device may provide the desired functionality using either a virtual device or a physical device connected to the virtual machine. When the physical device is available, the guest operating system executing on a virtual machine can be instructed to utilize the physical device. When the VM needs to be migrated between hosts of different underlying hardware, or when the physical device becomes unavailable, e.g., through dynamic reconfiguration or reallocation of physical resources, the guest operating system can be instructed to utilize the virtual device. Further, in some embodiments, switching between virtual and physical devices may be prompted by policy considerations.

In some embodiments, a guest operating system executing on a VM can be configured to select between a virtual device and a physical device. For example, if the VM is executing on a host with an available physical device, that physical device may be made available directly to the guest operating system of the VM, e.g., using a pass-through approach. However, the virtual device can be selected if necessary or desirable. For example, if that physical device is no longer available, e.g., because the host machine's configuration has changed, or the physical device is reassigned to another VM, the guest operating system can use a virtual device instead. Similarly, when the VM is migrated to a new host, the virtual device may be selected to facilitate the checkpoint process. One such embodiment uses a "teaming driver," in which multiple device drivers, and their corresponding devices, can be "teamed" or similarly grouped. Such teaming can be utilized, for example, to provide failover redundancy or load balancing. In accordance with one or more such embodiments, the device driver corresponding to the physical device and the driver corresponding to the virtual device are teamed, and configuration of the teaming driver allows the appropriate device driver to be utilized. Such an embodiment is described in greater detail, below.

Figure 4:
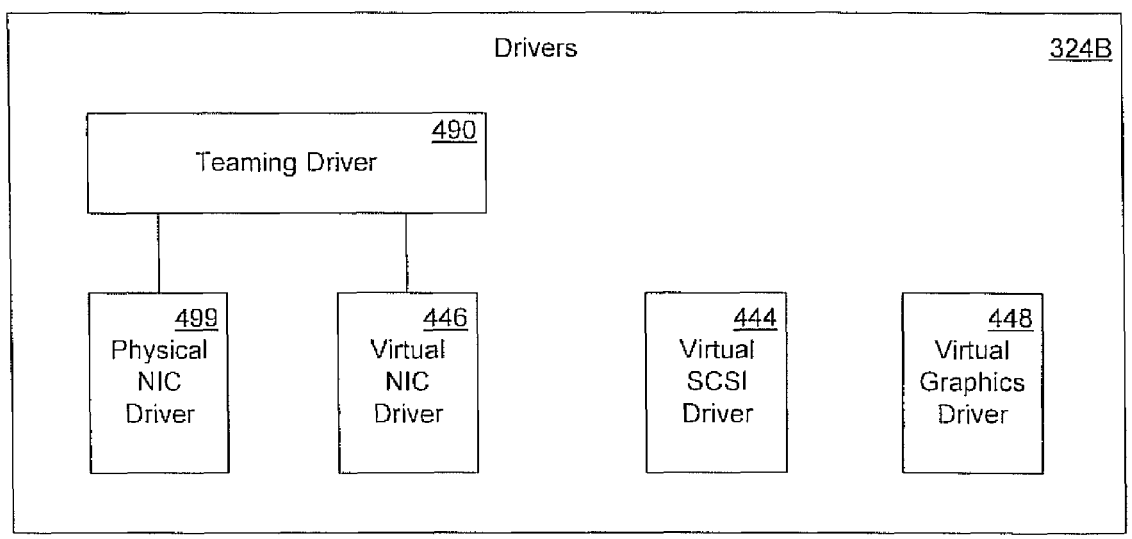
FIG. 4 is a block diagram showing selected elements of device drivers for a guest operating system executing on the VMs of FIGS. 3A and 3B in accordance with one embodiment of the present invention.

FIG. 4 is a block diagram corresponding to drivers 324B, as depicted in FIG. 3A. As shown in FIG. 4, guest OS 320B includes device drivers corresponding to virtual devices and available physical devices. For example, drivers 324B include virtual SCSI driver 444, virtual NIC driver 446, and virtual graphics driver 448 corresponding to SCSI 344B, NIC 346B, and graphics adapter 348B, respectively. Drivers 324B is also shown as including physical NIC driver 499; in the depicted embodiment, physical NIC driver 499 is used by guest OS 320B to interact with NIC 46 which has been made available via the pass-through approach.

Drivers 324B is also depicted as including teaming driver 490. In this embodiment, teaming driver 490 is utilized to select between multiple drivers included in a given "team," such as physical NIC driver 499 and virtual NIC driver 446. By configuring the teaming driver, the guest operating system for a VM can be instructed to utilize a physical device, e.g., a pass-through, in situations where such a physical device is available; when the physical device is not available, a virtual device can be utilized. In some embodiments, a VM will always use a device selected by the teaming driver. However, in other embodiments, more granular control over interactions between a VM and a physical device can be implemented via a teaming driver. For example, the teaming driver could be configured to allow certain interactions directly with a physical device, while other interactions may have to be performed via a virtual device.

When a pass-through approach is utilized, VM 300B may directly access physical hardware made available to the VM. With pass-through software running, VM 300B can interact directly with physical device hardware through memory-mapped I/O or port I/O operations and/or information passed through shared memory region(s), for example.

It is understood that in some embodiments, multiple instances of a particular device driver may be utilized. In this way, these embodiments allow for greater flexibility in use of available devices, both physical and virtual. For example, VM 300B and drivers 324B may use multiple instances of physical NIC driver 399.

Figure 5:
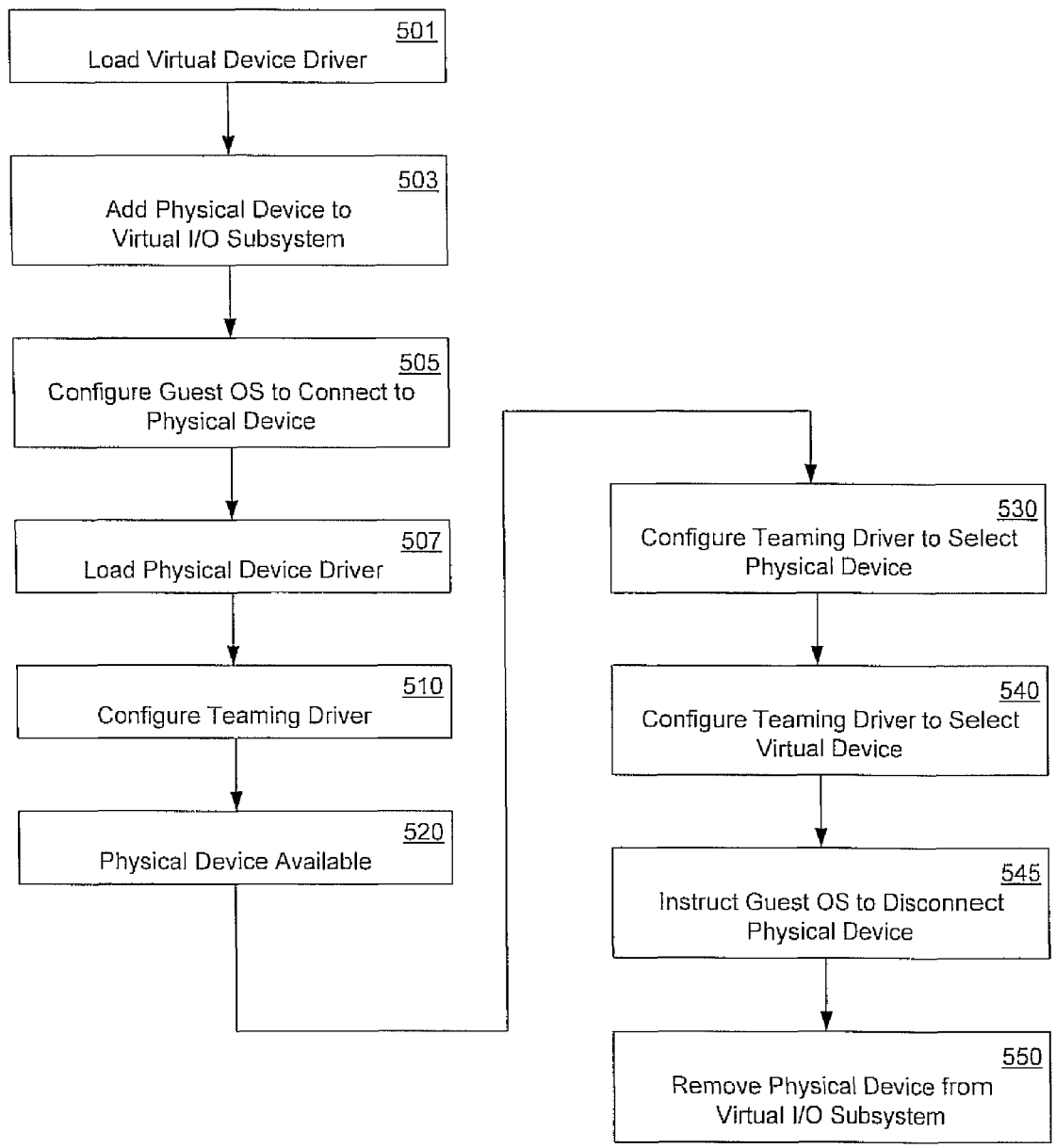
FIG. 5 is a flowchart of a method of selecting between a physical device and a virtual device in accordance with one embodiment of the present invention.

With reference now to FIG. 5, flowchart 500 of a method of selecting between a physical device and a virtual device is depicted in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

In accordance with one or more embodiments, a virtualized environment is assumed, such as the virtualized environment described in conjunction with FIGS. 2A, 2B, 3A, and 3B. Specifically, the virtualized environment for flowchart 500 includes a guest operating system executing within a VM. The VM, in turn, is controlled by virtualization software. Both the VM and the virtualization software are executing on top of system hardware, which includes several physical devices. The virtualization software can be used to configure the VM to allow the guest operating system to directly access one of these physical devices. One approach involves using a pass-through technique, where the physical device can be added to the virtualized hardware for the VM, e.g., by adding the physical device to the virtual PCI bus for the VM.

With reference to step 501, in some embodiments, it may be necessary to load a device driver corresponding to a selected virtual device into the guest operating system. In several such embodiments, the appropriate device driver can be added during installation of the guest operating system, e.g., when setting up the VM. In other embodiments, the appropriate device driver may be retrieved by the guest operating system when the virtual device is made available to the VM, e.g., the guest operating system may detect the new device when it is added to the virtual PCI bus for the VM, and attempt to obtain a correct device driver for that device. In other embodiments, the guest operating system may already have an appropriate device driver for the virtual device, and this step may be omitted.

For example, with reference to the proceeding figures, virtual NIC driver 446 is added to VM 300B to enable VM 300B to use a virtual NIC supported by virtualization software 150B.

With reference now to step 503, the physical device is added to the virtual input output (I/O) subsystem of the VM. In different embodiments, different I/O subsystems may be utilized. For example, with reference to the proceeding figures, VM 300B includes virtual PCI bus 342B. NIC 46 is added to virtual PCI bus 342B by means of PCI pass-through device 399 (refer to FIG. 3B).

With reference now to step 505, a guest operating system for a VM is configured to connect to the physical device. In different embodiments, different approaches may be utilized. For example, in some embodiments, SHPC (PCI Standard Hot-Plug Controller), ACPI hot-plug, or PCI-e hot-plug techniques may be utilized to instruct the guest operating system to connect to the physical device, e.g., by means of a virtual I/O subsystem.

With reference to step 507, in some embodiments, it may be necessary to load a device driver corresponding to a selected physical device into the guest operating system. In several such embodiments, the appropriate device driver can be added during installation of the guest operating system, e.g., when setting up the VM. In other embodiments, the appropriate device driver may be retrieved by the guest operating system when the physical device is made available to the VM, e.g., the guest operating system may detect the new device when it is added to the virtual PCI bus for the VM, and attempt to obtain a correct device driver for that device. In other embodiments, the guest operating system may already have an appropriate device driver for the physical device, and this step may be omitted.

For example, physical NIC driver 499 is loaded into drivers 324B of guest operating system 320B.

With reference now to step 510, a teaming driver is configured to group instantiations of the physical device and a corresponding virtual device. As discussed above, multiple instances of a single device driver, for a physical or virtual device, may be utilized to enable multiple "teams" to make use of a physical or virtual device. In some embodiments, a teaming or bonding driver may already be available in the guest operating system; in such an embodiment, the teaming driver may be modified to support the desired behavior. In other embodiments, the teaming driver may need to be loaded into the guest operating system, e.g., by the virtualization software.

The teaming driver, in these embodiments, is used to select between the device driver corresponding to the physical device, and the device driver corresponding to the associated virtual device. When the guest operating system needs to perform a certain action, the teaming driver causes the guest operating system to interact with the selected device, be it physical or virtual. For example, with reference to FIG. 4, teaming driver 490 selects between physical NIC driver 499 and virtual NIC driver 446. When guest OS 320B attempts to access network 60, teaming driver 490 will cause the guest OS to interact either with physical NIC driver 499 or virtual NIC driver 446.

It is understood that embodiments are well suited to other applications. For example, in one embodiment, a teaming driver may be utilized to select between multiple physical devices, multiple virtual devices, or combinations thereof. In this way, embodiments may be utilized to provide additional functionality, e.g., load-balancing or failover across multiple available physical devices in a virtualized environment, while preserving the ability to switchover to virtual devices when desired.

With reference to step 520, in some embodiments, the physical device becomes available to the VM. As previously discussed, in some situations it is advantageous to allow a VM to interact directly with a physical device, rather than restricting such interactions to a virtualized approach. In one such situation, a pass-through approach can be used to allow a VM, and the guest operating system executing thereon, to interact with the physical device. The physical device is added to the virtualized hardware for the VM, e.g., by adding an interface for the physical device to the appropriate virtual hardware bus.

For example, with reference to the preceding figures, PCI pass-through device 399 is added to PCI bus 342B, allowing VM 300B to interact directly with NIC 46.

With reference now to step 530, the teaming driver is configured to select the available physical device. As discussed above, a teaming driver can be used to direct guest OS actions to either a physical device or a virtual device. When the physical device becomes available, e.g., is connected to the virtualized hardware for the VM, the virtualization software can configure the teaming driver to direct appropriate guest OS interactions to the physical device driver. In different embodiments, the teaming driver may be configured in different ways. For example, the teaming driver may be configured to provide failover functionality, if the physical device should become unavailable, so that VM access is to the virtual device.

In some embodiments, when the teaming driver is configured to use the available physical device, the virtual device may be removed from the VM. In such an embodiment, the virtual device only needs to be present when the physical device is unavailable, or about to become unavailable. Such embodiments may also add the virtual device to the system as part of the following step.

With reference now to step 540, the teaming driver is configured to select the virtual device. If the physical device needs to be disconnected, or is otherwise no longer available, the virtualization software can configure the teaming driver to utilize the virtual device driver, and direct appropriate guest OS interactions thereto. For example, if the VM is migrated to a different host with different underlying hardware, or if the physical device needs to be used by a different VM, the physical device may no longer be available. In such a case, the teaming driver will allow the guest OS to utilize the appropriate virtual device, and thereby continue functioning.

With reference now to step 545, the guest OS is instructed to disconnect the physical device. In some embodiments, the guest OS should be notified before a physical device is disconnected from the virtual hardware for VM. In several such embodiments, such notification allows for a "clean" removal of a physical device, which is useful for preventing the VM from looping or hanging during execution. In these embodiments, the controlling virtualization software can instruct the guest OS to disconnect the physical device from the virtual bus. As discussed above, with reference to step 505, different embodiments utilize different approaches for instructing a guest OS to connect to or disconnect from a device. In other embodiments, the physical device can be removed from the virtual hardware without interacting with the guest OS.

With reference now to step 550, the physical device is removed from the virtual I/O subsystem of the VM. As discussed above, with reference to step 503, different embodiments may utilize different approaches, e.g., depending in part upon the nature of the virtual I/O subsystem used in the VM.

In some embodiments, the method described in flowchart 500 allows for a VM to be migrated across hosts with differing hardware. As a VM moves to a new host, device drivers corresponding to the physical devices which may be available for direct interaction with the VM can be added to the guest operating system. The teaming driver can be updated or modified as necessary to group physical device drivers with their virtualized counterparts, and so the VM can make use of any physical devices which are available to it, and for which device drivers can be loaded.

Portions of the methods and techniques described above provide certain advantages in a virtualized environment. For example, a VM may be executing on a first host, and utilizing pass-through to allow for more efficient I/O interaction with the host hardware. If the VM is to be migrated to a second host, a teaming driver within the guest OS can be used to select appropriate virtual devices, and the guest OS instructed to disconnect from the physical devices, before the hypervisor disconnects the physical devices from the VM's I/O subsystems. When the VM is migrated to the second host, if pass-through support is available, the hypervisor on this second host can connect available physical devices to the VM's I/O subsystems. The guest OS can be instructed to connect to the available physical devices via the virtual I/O subsystems, and appropriate drivers can be loaded. The teaming driver can then be configured to select the available physical devices, thereby allowing for efficient utilization of the second host.

In the preceding example, the specifics of the hardware available on the first and second hosts may differ, e.g., different models or vendors of NIC, without affecting the successful migration. Further, which physical devices are available for use by the VM may change without affecting VM operation, aside from the performance-related impact of virtual devices versus pass-through connections to physical devices. For example, the first host may make a NIC available for pass-through, while the second host makes a graphics adapter available; operation of the VM and guest OS are unaffected.

In summary, one or more embodiments in accordance with the present invention provide the high performance associated with pass-through operation, across a differing spectrum of host hardware, while preserving VM mobility.

One or more embodiments of the present invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (compact discs), one or more DVDs (digital versatile discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

What is claimed is:

1. A computer readable storage medium embodying computer instructions for a virtualized computer system, the computer instructions including instructions for:

at least one virtual machine (VM), each VM including guest system software including a teaming driver, a virtual I/O device driver, and a physical I/O device driver; and virtualization software that interfaces with physical hardware of a host and with the VM, causing the VM to execute on the host;

wherein:

the VM, when using the virtual I/O driver, accesses a virtual I/O device that is emulated by the virtualization software to provide access to a physical I/O device on the host, the virtualization software executing on the host and outside the VM;

the VM, when using the physical I/O device driver, accesses the physical I/O device directly; and the virtualization software instructs the teaming driver to cause the VM to utilize the physical I/O device driver or the virtual I/O device driver to access the physical I/O device.

2. The computer readable storage medium embodying computer instructions for the virtualized computer system of claim 1 wherein:

the teaming driver can select between multiple physical I/O devices, multiple virtual I/O devices, or combinations thereof, the VM being able to access each of the multiple physical I/O devices through a direct physical I/O device driver or through a corresponding virtual I/O device driver.

3. The computer readable storage medium embodying computer instructions for the virtualized computer system of claim 1 wherein:

a guest operating system of the VM includes the teaming driver, and the teaming driver controls if the virtual I/O driver or the physical I/O device driver is used when particular I/O operations for the physical I/O device are performed.

4. The computer readable storage medium embodying computer instructions for the virtualized computer system of claim 3 wherein the virtualization software instructs the guest operating system to cause the teaming driver to utilize the virtual I/O device driver or the physical I/O device driver.

5. The computer readable storage medium embodying computer instructions for the virtualized computer system of claim 4 wherein the virtualization software instructs the guest operating system based on a policy.

6. The computer readable storage medium embodying computer instructions for the virtualized computer system of claim 4 wherein the virtualization software instructs the guest operating system to cause the teaming driver to utilize the physical I/O device driver when the physical I/O device is available, and to utilize the virtual I/O device driver when the physical I/O device is not available.

7. The computer readable storage medium embodying computer instructions for the virtualized computer system of claim 3 wherein the guest operating system is configured to cause the teaming driver to utilize the virtual I/O device driver or the physical I/O device driver.

8. The computer readable storage medium embodying computer instructions for the virtualized computer system of claim 1 wherein the physical I/O device is made available to the physical I/O device driver by pass-through software in the virtualization software.

9. The computer readable storage medium embodying computer instructions for the virtualized computer system of claim 8 wherein the pass-through software adds the physical I/O device to virtualized hardware for the VM.

10. The computer readable storage medium embodying computer instructions for the virtualized computer system of claim 9 where the virtualized hardware includes a virtual PCI bus.

11. The computer readable storage medium embodying computer instructions for the virtualized computer system of claim 8 wherein the physical I/O device is accessed through memory-mapped I/O or port I/O operations and/or information passed through a shared memory region.

12. The computer readable storage medium embodying computer instructions for the virtualized computer system of claim 1 wherein the teaming driver is configured to select the physical I/O device driver for predetermined I/O operations and to select the virtual I/O device driver for other predetermined I/O operations.

13. In a virtualized computer system comprising at least one virtual machine (VM) that includes a guest operating system and a teaming driver, a method of selecting software in the VM for I/O operations that comprises:
    loading a virtual I/O device driver for a virtual I/O device into the guest operating system, the virtual I/O device providing access to a physical I/O device by virtualization software executing in a host and outside the VM;
    loading a physical I/O device driver for the physical I/O device into the guest operating system; and
    configuring the teaming driver to group instantiations of a corresponding physical I/O device driver and the virtual I/O device driver;
    wherein the virtualization software instructs the teaming driver to cause the guest operating system to interact either with the physical I/O device driver or the virtual I/O device driver to access the physical I/O device.

14. The method of claim 13 which further comprises:
    the teaming driver causing access using the virtual I/O device driver if the physical I/O device is or becomes unavailable.

15. The method of claim 13 which further comprises:
    if the physical I/O device needs to be disconnected, or is otherwise no longer available, the virtualization software causing the teaming driver to be configured to utilize the virtual I/O device driver.

16. The method of claim 13 which further comprises:
    if the VM is migrated to a different host computer with different underlying hardware, or if the physical I/O device needs to be used by a different VM of the virtualized computer system, the virtualization software causing the teaming driver to be configured to utilize the virtual I/O device driver.

17. The method of claim 13 which further comprises:
    the virtualization software instructing the guest operating system to disconnect the physical I/O device from a virtual bus of the VM.

18. The method of claim 13 which further comprises:
    moving the VM to a new host;
    adding physical I/O device drivers corresponding to physical I/O devices available on the new host to the guest operating system; and
    causing the teaming driver to group physical I/O device drivers with virtual I/O device driver counterparts.

19. The method of claim 13 which further comprises:
    before the VM is migrated to a second host, instructing the teaming driver to use predetermined virtual I/O device drivers,
    instructing the guest operating system to disconnect from physical I/O devices before virtualization software disconnects the physical I/O devices from VM I/O subsystems;
    after the VM is migrated to the second host, virtualization software connecting available physical I/O devices to the VM I/O subsystems;
    instructing the guest operating system to connect to available physical I/O devices;
    if not already available, loading physical I/O drivers for the available physical I/O devices; and
    configuring the teaming driver to select the physical I/O drivers.

20. A computer readable storage medium embodying computer instructions for virtualization software executing in a host, the computer instructions for the virtualization software including instructions for:
    virtual system hardware for a virtual machine (VM), the virtual system hardware including an emulated virtual I/O device that is emulated in software and a virtual I/O pass-through device that provides direct access from the VM to a physical I/O device without software device emulation; and
    a hypervisor that places the emulated virtual I/O device in communication with the physical I/O device, the hypervisor dynamically allocating I/O device resources to the VM by exposing the physical I/O device to the VM when the physical I/O device is available for exclusive use to the VM, thereby allowing the VM to select, using a teaming driver, between directly accessing the physical I/O device using the virtual I/O pass-through device when the physical I/O device is available for exclusive use by the VM and the emulated virtual I/O device when the physical I/O device is not available for exclusive use by the VM.

* * * * *